(12) United States Patent
Cusick et al.

(10) Patent No.: US 6,227,009 B1
(45) Date of Patent: May 8, 2001

(54) METHOD OF MAKING LONG, FINE DIAMETER GLASS FIBERS AND PRODUCTS MADE WITH SUCH GLASS FIBERS

(76) Inventors: Michael John Cusick, 8137 S. Spruce Cir., Englewood, CO (US) 80112; Kenneth Andrew Clocksin, 13231 Mohler Rd., Grand Rapids, OH (US) 43522

( * ) Notice: Subject to any disclaimer, the term of this patent is extended or adjusted under 35 U.S.C. 154(b) by 0 days.

(21) Appl. No.: 09/210,928

(22) Filed: Dec. 14, 1998

(51) Int. Cl.[7] .................................................. C03B 37/04
(52) U.S. Cl. .............................. 65/460; 65/459; 65/462; 65/463; 65/465; 65/468; 264/8; 264/12
(58) Field of Search ............................ 264/8, 12; 65/459, 65/460, 462, 463, 465, 468

(56) References Cited

U.S. PATENT DOCUMENTS 4,832,723 * 5/1989 Shisler et al. ............................ 65/14
5,693,117 * 12/1997 Watton .................................. 65/461

* cited by examiner

*Primary Examiner*—Christopher Raimund (57) ABSTRACT

Relatively viscous glass is fiberized in a rotary fiberization process at relatively high disk speeds and through relatively large diameter holes to form long, fine diameter glass fibers which preferably are rapidly solubilized in biological fluids. The method of forming the long, fine diameter glass fibers includes maintaining a ratio of the velocity of the external surface of the peripheral wall of the fiberizing disk to the velocity of the glass passing through the fiberizing orifices within a specific range (the disc/glass velocity ratio); maintaining a ratio of the velocity of the air exiting the air ring to the velocity of the glass passing through the fiberizing orifices within a specific range (the air-ring/glass velocity ratio); and maintaining a ratio of the BTU content of the fuel expended forming the hot attenuating combustion gases to the BTU content of a pound of molten glass being fiberized within a specific range (the attenuating combustion gases/glass heat content ratio). Air-laid and wet-laid fibrous mats are made from these glass fibers for various applications, such as but not limited to, battery separators, ASHRAE paper, and HEPA and ULPA filtration papers.

51 Claims, 2 Drawing Sheets

METHOD OF MAKING LONG, FINE DIAMETER GLASS FIBERS AND PRODUCTS MADE WITH SUCH GLASS FIBERS

BACKGROUND OF THE INVENTION

The present invention relates to a method of making glass fibers wherein relatively viscous glass is fiberized in a rotary fiberization process at relatively high disc speeds and through relatively large diameter holes to form long, fine diameter glass fibers. Air-laid and wet-laid fibrous mats are made from these glass fibers for various applications, such as but not limited to, battery separators, ASHRAE papers, and HEPA and ULPA filtration papers.

Battery separators, ASHRAE papers and filtration papers such as HEPA and ULPA filtration papers are commonly made from glass fibers. The glass fibers used to form these products normally include fibers made by rotary fiberization processes which attenuate the fibers in a curtain of heated air and hot combustion gases and flame attenuation processes, such as but not limited to, pot and marble flame attenuation processes which attenuate the fibers at higher temperatures in a burner flame.

In a typical rotary fiberization process, one or more rotary fiberizers are located in the upper portion of a collection chamber. Each rotary fiberizer has a rapidly rotating fiberizing disc. A stream of molten glass is introduced into the rapidly rotating disc which contains numerous fine diameter orifices in an annular outer peripheral sidewall. The number and the diameter of the orifices varies. For example, the annular outer peripheral sidewalls typically have from several hundred orifices to tens of thousands of orifices ranging from about 0.010 inches to about 0.025 inches in diameter. As the primary glass fibers exit the orifices in the disc sidewall in a generally horizontal direction, the primary glass fibers are introduced into a generally downward directed hot annular curtain of high velocity heated air and combustion gases surrounding the disc, e.g. an annular curtain of hot gases formed by the combustion gases from a burner and a high velocity air stream emitted from an air ring. The hot, high velocity curtain of heated air and combustion gases attenuates the primary fibers exiting the orifices and forms the primary fibers into staple fibers of lesser diameters (typically having a uni-modal fiber distribution with a mean diameter of 2.8 microns or greater). These fibers pass down through the collection chamber and are normally collected on a moving foraminous collection chain conveyor located in the lower portion of the collection chamber.

In a typical flame attenuation process, such as a pot and marble process or similar processes, continuous primary filaments are pulled from a plurality of orifices located in the bottom of a pot or melter containing molten glass by pull rolls located beneath the pot or melter. The continuous primary filaments are then passed through a filament guide and introduced at generally right angles directly into the high velocity flame of a burner where the continuous primary filaments are attenuated and formed into long, staple glass fibers having very fine diameters. The high velocity combustion gases from the flame then carry the fibers through a forming tube and onto a moving inclined foraminous collection chain conveyor located at the opposite end of the forming tube.

Both of the fiberization processes discussed above, the rotary hot air and combustion gas attenuating processes and the flame attenuation processes, produce fibers over a range of fiber diameters with the fiber diameter distribution within those ranges, when plotted in a graph, forming a generally bell shaped curve. These fiber diameter distributions are uni-modal fiber diameter distributions.

Figure 4:
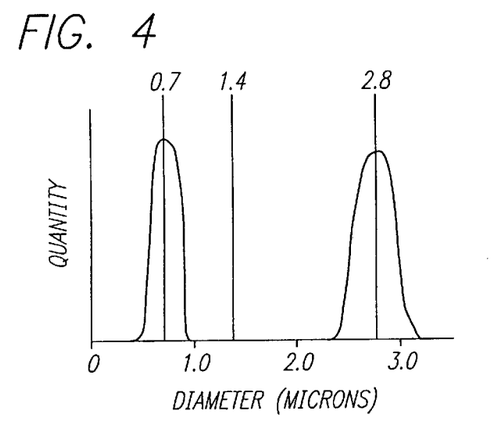
FIG. 4 is a schematic graphic representation of the bi-modal fiber diameter distribution of a prior art fibrous mat, such as but not limited to a battery separator, made with fibers produced by a rotary process and a flame attenuation process.

The fibers produced by the above discussed rotary fiberization processes are considerably less expensive to produce than fibers produced by the flame attenuation processes. However, in the past, fibers made by these rotary fiberization processes (having uni-modal fiber diameter distributions with mean diameters that are less than 2.8 microns) become increasingly shorter and more difficult to form using these prior art rotary fiberization processes and become unacceptable for use in many applications, e.g. due in part to their relatively short lengths, high shot content and poor tensile strength. Thus, for products which require long, fine diameter fibers (fibers having a uni-modal fiber diameter distribution with a mean diameter of less than 2.8 microns and more especially 2.5 microns or less, such as but not limited to battery separator media (which require fibers with a mean diameter of about 1.4 microns), ASHRAE papers, and HEPA and ULPA filtration papers, the more costly fibers made by pot and marble flame attenuation and similar flame attenuation processes have been used exclusively or, where the product application permits, in combination with the coarser diameter fibers made by a rotary fiberization process. For example, battery separator media are currently formed from fiber blends having a bi-modal fiber diameter distribution and a mean diameter of about 1.4 microns. In an attempt to provide the required performance characteristics for such products while lowering product costs the mean fiber diameter for such blends (e.g. about 1.4 microns) is typically achieved by including flame attenuated fibers having a uni-modal fiber diameter distribution with a mean diameter of about 0.7 microns and rotary fibers having a different uni-modal fiber diameter distribution with a mean diameter of about 2.8 microns as schematically represented in FIG. 4. A typical fiber blend for such a product thereby has a bi-modal fiber distribution of about 40% by weight fibers having a mean diameter of about 0.7 microns and about 60% by weight fibers having a mean diameter of about 2.8 microns which combined gives the product, as a whole, a mean fiber diameter of about 1.4 microns.

Thus, there has been a need for long, fine diameter glass fibers (fibers having a uni-modal fiber diameter distribution with a mean diameter less than 2.8 microns, preferably less than about 2.5 microns, more preferably less than about 2.0 microns, and most preferably about 1.4 microns) made by a rotary fiberization process, for making air-laid and wet-laid products, such as but not limited to battery separator media, ASHRAE papers, and HEPA and ULPA filtration papers, that have the required physical properties for these applications. Furthermore, there has been a need in the market place for air-laid and wet-laid products, such as those set forth above, that are less expensive than those products currently on the market.

In the preparation and/or subsequent processes and handling of glass fiber products a portion of the glass fibers forming the products are often cut or broken into lengths which may be inhaled. As it is impractical or impossible to remove such fibers from the body, it has become important to create glass compositions which exhibit high degrees of biosolubility, i.e. which are rapidly solubilized in biological fluids.

SUMMARY OF THE INVENTION

To produce glass fibers by a rotary fiberization process, finer than those currently made by commercially used rotary fiberization processes, conventional wisdom would suggest forming the fibers by passing hot, fluid (relatively low viscosity) molten glass through small diameter orifices of a rotary fiberizing disc (orifices which are smaller in diameter than or have diameters at the low end of the diameter range of those orifices commonly used in rotary fiberizing discs) at relatively high disc speeds. However, attempts to produce fine glass fibers by this method have resulted in the formation of short fine glass fibers of marginal quality with a high shot content and poor tensile strength.

The method of the present invention adopts a very different approach to produce long, fine diameter glass fibers of good quality with low shot content and good tensile strength. The method of the present invention forms long, fine diameter glass fibers by passing relatively viscous molten glass at high velocities through relatively large diameter orifices, for the diameter of the fibers being produced, in a rotary fiberizing disc. In the present invention, orifices about 0.023 inches or greater in diameter are used to produce fibers having a uni-modal fiber diameter distribution with a mean diameter less than 2.8 microns, preferably less than about 2.5 microns, more preferably less than about 2.0 microns, and most preferably about 1.4 microns for battery separator applications and other applications requiring such a uni-modal fiber diameter distribution. The primary fibers exiting the orifices of the fiberizing disc are further attenuated and formed into long, fine diameter glass fibers by a hot, high velocity annular curtain of heated air and combustion gases which is directed onto the primary fibers. The method also includes maintaining a ratio of the velocity of the external surface of the peripheral wall of the fiberizing disc to the velocity of the glass passing through the fiberizing orifices of the disc within a specific range (the disc/glass velocity ratio); maintaining a ratio of the velocity of the air exiting the annular air ring surrounding the disc to the velocity of the glass passing through the fiberizing orifices within a specific range (the air-ring/glass velocity ratio); and maintaining a ratio of the BTU content of the fuel expended forming the hot attenuating combustion gases per pound of glass being fiberized to the BTU content of a pound of the molten glass being fiberized within a specific range (the attenuating combustion gases/glass heat content ratio). By varying the disc/glass velocity ratio, the air-ring/glass velocity ratio, and the attenuating combustion gases/glass heat content ratio, the diameters of the long, fine diameter fibers produced by the method of the present invention can be controlled while maintaining a relatively long fiber length.

In preferred embodiments of the present invention, the glass fibers are made from a glass composition having a biodissolution rate in excess of 150 ng/cm$^2$/hr, more preferably in excess of 300 ng/cm$^2$/hr, and most preferably in excess of 400 ng/cm$^2$/hr so that such fibers, if inhaled are rapidly solubilized in the biological fluids of the person inhaling the fibers.

The long, fine diameter glass fibers made by the method of the present invention have a uni-modal fiber diameter distribution and the mean diameter of these long, fine diameter glass fibers is typically less than 2.8 microns, e.g. 1.4 microns for use in battery separators and the like. The method of the present invention can be used to produce fibers having a uni-modal fiber diameter distribution with a mean diameter greater than 2.8 microns. However, the method of the present invention is especially useful for forming long, fine diameter glass fibers having a uni-modal fiber diameter distribution with a mean diameter less than 2.8 microns, preferably less than about 2.5 microns, more preferably less than about 2.0 microns, and most preferably about 1.4 microns for battery separator and other applications requiring such a fine uni-modal fiber diameter distribution whereby the fibers produced by the method of the present invention can be used in applications for which fibers made by rotary fiberization processes were previously unsuited. Air-laid and wet-laid products made from these long, fine diameter glass fibers and having a uni-modal fiber diameter distribution, such as but not limited to, battery separators, ASHRAE papers, and HEPA and ULPA papers, may exhibit different and improved physical properties from such products made with blends of fibers (products having bi-modal fiber diameter distributions such as those represented in FIG. 4).

Battery separators made of the long, fine diameter glass fibers of the present invention with a uni-modal fiber diameter distribution have exhibited improved recoveries from compression when compared with battery separators made with fibers having a bi-modal fiber diameter distribution such as the battery separators discussed above in the background of the invention. A major problem encountered in batteries when using current battery separators made with fibers having bi-modal fiber diameter distributions is the premature failure of these batteries after a number of charging, discharging and recharging cycles due to the failure of the battery separators to fully recover from the repeated compressions undergone by the battery separators during these cycles. If the separators do not recover, a gap occurs between the separators and the electrode plates causing at least in part the premature failure of the battery. Battery separators made with the long, fine diameter glass fibers of the present invention with a uni-modal fiber diameter distribution are thicker for a given weight and it is believed that these battery separators may exhibit better recovery than battery separators made with a bi-modal fiber diameter distribution due to the absence of packing and densification of fibers which occurs in battery separators made with bi-modal fiber diameter distributions. It is believed that in a battery separator made with a bi-modal fiber diameter distribution, the finer fibers are displaced into the interstices between the larger diameter fibers during repeated compressions and expansions thereby reducing the thickness and the resilience of these battery separators. With the use of uni-modal fiber diameter distributions in battery separators made with the long, fine diameter fibers of the present invention this phenomena is greatly reduced and the battery separators better retain their thickness and resilience.

With respect to filters, the uni-modal fiber diameter distribution of the filtration products, e,g, ASHRAE filters, made with the fibers of the present invention provides these products with added loft. The added loft of these products increases their dirt holding capacities and reduces their initial pressure drops for a given filtration efficiency.

DESCRIPTION OF THE PREFERRED EMBODIMENTS

Figure 1:
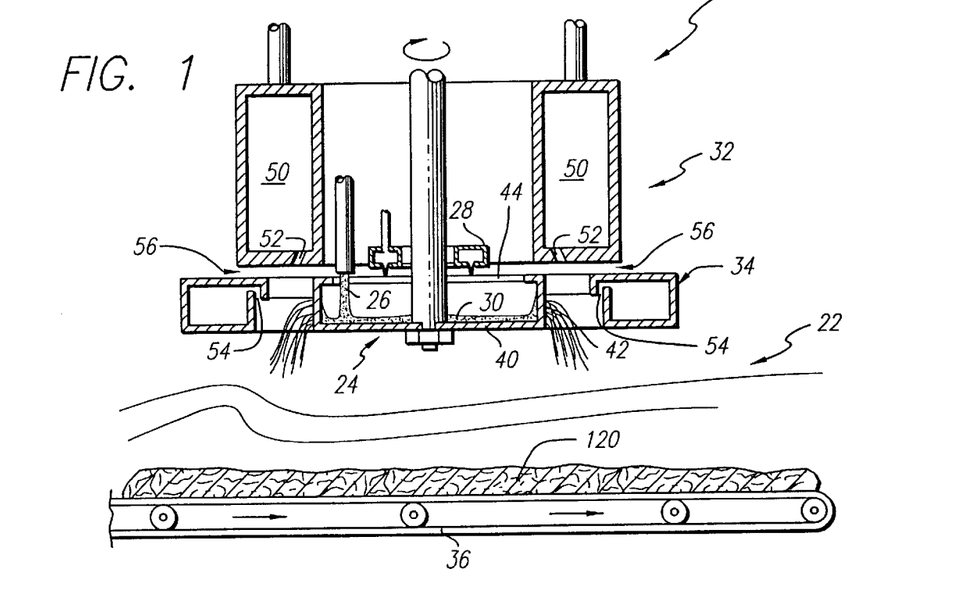
FIG. 1 is a schematic vertical cross section of a rotary fiberization apparatus and collection chamber, with portions broken away, for making long, fine diameter fibers by the method of the present invention.

FIG. 1 is a schematic elevation in cross section of a rotary fiberization apparatus which includes one or more fiberization units 20 (only one is shown) and a collection chamber 22 for making long, fine diameter glass fibers by the method of the present invention. Each fiberization unit includes: a rotary fiberizing disc 24; a stream 26 of molten glass being introduced into the interior of the rotary fiberizing disc 24; preferably, an internal burner 28 to adjust or maintain the temperature of the molten glass 30 within the rotary fiberizing disc 24 to aid in the control the viscosity of the molten glass 30 being fiberized; an annular attenuation burner 32 which directs an annular curtain of combustion gases downward along or adjacent the external sidewall surface of the rotary fiberizing disc 24; and an annular air ring 34 which directs an annular curtain of air downward externally of the sidewall of the rotary fiberizing disc 24. The fiberization units are housed within the upper portion of the collection chamber 22. A continuous, moving foraminous collection chain conveyor belt 36 is located in the lower portion of the collection chamber 22 with conventional suction or air exhaust units beneath the conveyor belt (not shown) creating a negative pressure to draw air down through the upper flight of the conveyor belt and the glass fibers down onto the conveyor belt where the glass fibers are collected to form a mat or blanket of randomly oriented glass fibers.

Figure 2:
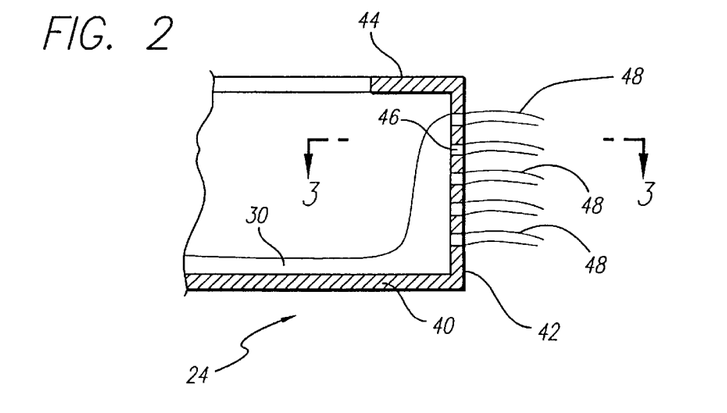
FIG. 2 is an enlarged partial vertical cross section of a portion of the rotary fiberization disc shown in FIG. 1.
Figure 3:
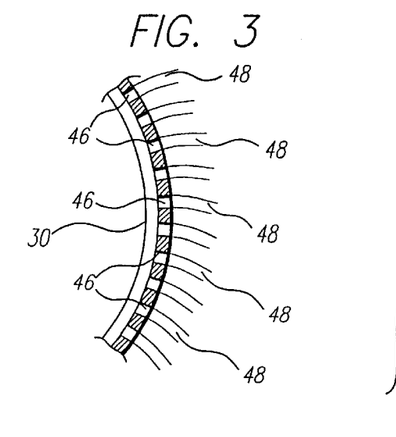
FIG. 3 is horizontal cross section taken substantially along lines 3—3 of FIG. 2.

As shown in FIGS. 1–3, the rotary fiberizing disc 24 of the fiberization unit 20 includes a bottom disc plate 40, an annular vertically extending sidewall 42 and an upper inwardly directed annular reinforcing flange 44. The sidewall 42 typically has thousands or tens of thousands of fiberizing orifices 46, about 0.023 inches in diameter or greater, passing through the sidewall and arranged in annular rows or other geometric patterns on the sidewall. Due to the centrifugal forces produced by the rapidly rotating fiberizing disc 24 which typically rotates at well over two thousand revolutions per minute (the revolutions per minute required to obtain the desired surface velocity of the outer surface of the sidewall 42 relative to the velocity of the molten glass 30 passing through the orifices 46 will vary depending on the diameter of the fiberizing disc), the molten glass 30, introduced into the rotary fiberizing disc 24 from the stream 26 of molten glass, flows across the bottom disc plate 40 and up the inner surface of sidewall 42 where it passes out through the orifices 46 in the sidewall to form primary fibers 48. As shown, the fiberization unit 20 is preferably provided with an internal burner 28 to adjust or maintain the temperature of the molten glass 30 within the rotary fiberizing disc 24 and thereby more exactly control the viscosity of the molten glass being fiberized through the orifices 46.

As shown in FIG. 1, the external attenuation burner 32 of the fiberization unit 20 has a combustion chamber 50 where a fuel (e.g. natural gas) and air mixture, introduced into the burner 32, is burned. The hot combustion gases exit the external attenuation burner 32 through annularly arranged outlet ports 52 to form a downward directed curtain of high velocity hot combustion gases.

The annular air ring 34 directs an annular curtain of high velocity air downward externally of and adjacent to the outer surface of the sidewall 42 of the rotary fiberizing disc 24. The flow of air from an annular outlet slot 54 in the inner side of the annular air ring 34 inspirates or draws in air through the annular gap 56 between the lower surface of the external attenuating burner 32 and the upper surface of the air ring 34 and, together with the hot combustion gases exiting from the external attenuating burner 32, creates a hot, high velocity curtain of heated air and combustion gases that passes downward along and adjacent the external sidewall surface of the rotary fiberizing disc 24. This curtain of hot, high velocity heated air and combustion gases intersects the primary fibers 48 exiting the orifices 46 at a sharp angle (typically an angle of about ninety degrees) to the longitudinal axes of the primary fibers to attenuate the primary fibers to their final diameter and length and directs the attenuated fibers toward the collection conveyor 36. Preferably, the size of the annular gap 56 between the lower surface of the external attenuating burner 32 and the upper surface of the air ring 34 is adjustable so that the flow of air through the gap 56 into the narrow annular attenuation zone external of the rotary fiberizing disc 24 can be regulated to optimize fiber attenuation in the attenuation zone.

Thus, in the method of the present invention, a stream 26 of molten glass is introduced into the interior of the rotary fiberizing disc 24 where the molten glass flows, due to centrifugal forces, across the bottom disc plate 40 and up the annular peripheral sidewall 42 of the rotary fiberizing disc 24. Preferably, the temperature of the molten glass 30 flowing across the bottom disc plate and up the inner surface of the peripheral annular sidewall 42 is heated by the burner 28 to maintain or adjust the temperature of the molten glass 30 to aid in controlling the viscosity of the molten glass within the rotary fiberization disc 24. The molten glass 30 then flows out through the fiberizing orifices 46 to form primary fibers. These primary fibers 48 exit the fiberizing orifices 46 in a generally horizontal direction and are introduced into the hot, high velocity annular curtain of heated air and combustion gases passing downward along or adjacent the outer surface of the sidewall 42 of the fiberizing disc. The hot, high velocity annular curtain of heated air and combustion gases impinge upon the primary fibers at a sharp angle, an angle of 90° or about 90°, to attenuate the fibers into long, fine diameter glass fibers and direct the attenuated fibers toward the collection conveyor where the fibers are collected to form a mat or blanket of randomly oriented glass fibers. As discussed above, while the method of the present invention can be used to form fibers having an uni-modal fiber distribution with a mean diameter of 2.8 microns or greater, the method of the present invention produces long fine diameter glass fibers having an uni-modal fiber distribution of less than 2.8 microns, preferably less than about 2.5 microns, more preferably less than about 2.0 microns, and most preferably about 1.4 microns for battery separator applications, so that the fibers produced by the method of the present invention can be used in applications for which fibers made by rotary fiberization processes were previously unsuited.

The method of the present invention relies on maintaining the viscosity of the molten glass being fiberized within a specific range plus maintaining the following three key ratios within specific ranges: the disc/glass velocity ratio; the air/glass velocity ratio; and the attenuating combustion gases/glass heat content ratio. Other important parameters affecting the method are the "effective open area" of the orifices in the disc and the velocity of the glass passing through the orifices which affect the production rate of the disc. All of the process parameters set forth in this paragraph will now be discussed in greater detail.

In the method of the present invention, long fine diameter glass fibers are most easily produced when the viscosity of the glass being fiberized is high and within certain limits either due to the chemistry of the glass or the temperature of the glass (cooler glass being more viscous). The viscosity of the molten glass being fiberized should be between about 250 poise and about 2000 poise; preferably between about 850 poise and about 1650 poise; and most preferably between about 1150 poise and about 1350 poise with the target viscosity being about 1250 poise.

In the method of the present invention, long fine diameter glass fibers are most easily produced when the ratio of the velocity of the external surface of the peripheral sidewall of the fiberizing disc to the velocity of the glass passing through the fiberizing orifices of the disc (the disc/glass velocity ratio) is maintained within a specific range. In the method of the present invention, the disc/glass velocity ratio should be between about 20,000 to 1 and about 40,000 to 1; preferably between about 25,000 to 1 and about 35,000 to 1; and most preferably between about 28,000 to 1 and about 32,000 to 1 with the target ratio being about 30,000 to 1.

In the method of the present invention, long fine diameter glass fibers are most easily produced when the ratio of the velocity of the air exiting the air ring to the velocity of the glass passing through the fiberizing orifices (the air-ring/glass velocity ratio) is maintained within a specific range. In the method of the present invention, the air-ring/glass velocity ratio should be between about 400,000 to 1 and about 1,200,000 to 1; preferably between about 600,000 to 1 and about 1,000,000 to 1; and most preferably between about 750,000 to 1 and about 850,000 to 1 with the target ratio being about 800,000 to 1.

In the method of the present invention, long fine diameter glass fibers are most easily produced when the ratio of the BTU content of the fuel expended forming the hot attenuating combustion gases per pound of glass being fiberized to the BTU content of a pound of the molten glass 30 being fiberized through the orifices 46 (the attenuating combustion gases/glass heat content ratio) is maintained within a specific range. In the method of the present invention, the attenuating combustion gases/glass heat content ratio should be between about 10 to 1 and about 30 to 1; preferably between about 14 to 1 and about 25 to 1; and most preferably between about 21 to 1 and about 23 to 1 with the target ratio being about 22 to 1. By varying the disc/glass velocity ratio, the /air-ring/glass velocity ratio, and the attenuating combustion gases/glass heat content ratio, the diameters of the long, fine diameter fibers produced by the method of the present invention can be controlled while maintaining a relatively long fiber length.

In the method of the present invention, long fine diameter glass fibers are most easily produced when the velocity of the molten glass passing through the orifices 46 is maintained within a specific low velocity range. The term "effective open area of a disc" is the number of orifices 46 in a disc multiplied by the area of each orifice. In the method of the present invention these low molten glass velocities through the orifices 46 are produced with acceptable production rates when the effective open area of the disc is between about 20 cm$^2$ and about 80 cm$^2$; preferably between about 40 cm$^2$ and about 70 cm$^2$; more preferably between about 45 cm$^2$ and about 55 cm$^2$; and most preferably about 50 cm$^2$. In the method of the present invention, the velocity of the molten glass passing through the orifices 46 should be between about 3 cm/minute and about 15 cm/minute; preferably between about 5 cm/minute and about 13 cm/minute; more preferably between about 6 cm/minute and about 10 cm/minute; and most preferably about 8 cm/minute.

Figure 5:
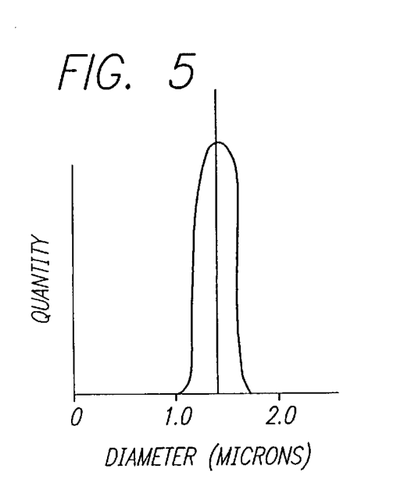
FIG. 5 is a schematic graphic representation of the unimodal fiber diameter distribution of a fibrous mat, such as but not limited to a battery separator, made with the fibers of the present invention.

As discussed above, while the method of the present invention can be used to form long, glass fibers having an uni-modal fiber diameter distribution with a mean diameter of 2.8 microns or greater, the method of the present invention is primarily intended for making glass fibers having an uni-modal fiber diameter distribution with a mean fiber diameter of less than 2.8 microns. The method of the present invention is particularly suited for making long, fine diameter glass fibers having an uni-modal fiber diameter distribution with a mean diameter between less than 2.8 microns, preferably less than about 2.5 microns, more preferably, less than about 2.0 microns, and most preferably about 1.4 microns for applications such as but not limited to battery separators. FIG. 5 is a schematic graphic representation of the fiber diameter distribution of fibers made by the method of the present invention for applications such as, but not limited to, battery separators. In the example of FIG. 5, the fiber diameters range from a low of about 1.1 microns to a high of about 1.7 microns with the mean diameter of the fibers being about 1.4 microns. Preferably, the long, fine diameter staple glass fibers produced by the method of the present invention, with a unimodal fiber diameter distribution having a mean diameter of 1.4 microns, have an average length, as measured by the Bauer-McNett testing method, of about 1.0 millimeters or greater; more preferably about 1.5 millimeters or greater; and most preferably about 2.0 millimeters or greater.

While other glass compositions may be used in the method and in the fibers of the products of the present invention, the following preferred glass composition performs very well in the method of the present invention; has good biosolubility; good acid resistance; and is especially suited for making fibers for use in battery separators and other applications. The composition of this glass, in mol percent, is as follows:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | where $R_2O$ is an alkali metal oxide and RO is an alkaline earth metal oxide. $R_2O$ is preferably $Na_2O$ in most substantial part, while RO may be MgO and/or CaO, preferably both, in a molar ratio of MgO/CaO of 1:3 to 3:1, more preferably 2:3 to 3:2. The chemical behavior of the glass is dictated by three ratios which the glass composition must meet, C(acid), C(bio), and C(moist). These ratios are defined compositionally as follows, all amounts being in mol percent:

C(acid)=$[SiO_2]/([Al_2O_3]+B_2O_3]+[R_2O]+[RO])$
C(bio)=$([SiO_2]+[Al_2O_3])/(B_2O_3]+[R_2O]+[RO])$
C(moist)=$([SiO_2]+[Al_2O_3]+(B_2O_3])/([R_2O]+[RO])$.

In these ratios, C(acid) is the ratio which pertains to chemical resistance in acid environments, C(bio) is the ratio which is most closely linked to biosolubility, and C(moist) is the ratio which relates to the retention of properties in moist environments. It is desired that C(acid) and C(moist) be as large as possible, while C(bio) should be as low as possible. It has been found that glass fibers of high biosolubility maintain other necessary physical properties, such as chemical resistance and moisture resistance, when C(acid) is equal to or greater than 1.95, C(bio) is equal to or less than 2.30, and C(moist) is equal to or greater than 2.40.

Preferably, the biosoluble glass fibers used in the method and glass fibers of the products of the present invention, have a composition which falls within the following ranges (in mol percent):

| | |
|---|---|
| $SiO_2$ | 66–69.0 |
| $Al_2O_3$ | 0–2.2 |
| RO | 7–16 |
| $R_2O$ | 9–19 |
| $B_2O_3$ | 0–7.1 |

Most preferably, the biosoluble glass fibers used in the method and the glass fibers of the products of the present invention, have a composition which falls within the following ranges (in mol percent):

| | |
|---|---|
| $SiO_2$ | 66–68.25 |
| $Al_2O_3$ | 0–2.2 |
| RO | 7–13 |
| $R_2O$ | 11–18 |
| $B_2O_3$ | 0–7.1 |

With respect to the performance characteristics of the glass fibers used in the method and products of the present invention, it is preferred that C(acid) be greater than or equal to 2.00; C(bio) be less than or equal to 2.23, more preferably, less than or equal to 2.20; and that C(moist) be greater than or equal to 2.50, preferably greater than or equal to 2.60. As discussed previously, it is most desirable that C(acid) and C(moist) values be as high as possible. For example, C(moist) values of 3.00 or greater are particularly preferred. It should also be noted that the various C-ratios are independent in the sense that a more preferred glass need not have all "more preferred" C-ratios.

The acid resistance of the fibers may be measured by battery industry standard tests. For example, a typical test involves the addition of 5 grams of nominally 3 micron diameter fiber in 50 mL of sulfuric acid having a specific gravity of 1.26. Following refluxing for 3 hours, the acid phase may be separated by filtration and analyzed for dissolved metals or other elements.

The procedure used to evaluate biodissolution rate of the fibers is similar to that described in Law et al. (1990). The procedure consists essentially of leaching a 0.5 gram aliquant of the candidate fibers in a synthetic physiological fluid, known as Gamble's fluid, or synthetic extracellular fluid (SEF) at a temperature of 37° C. and rate adjusted to achieve a ratio of flow rate to fiber surface area of 0.02 cm/hr to 0.04 cm/hr for a period of up to 1,000 hours duration. Fibers are held in a thin layer between 0.2 micron polycarbonate filter media backed by plastic support mesh and the entire assembly placed within a polycarbonate sample cell through which the fluid may be percolated. Fluid pH is regulated to 7.4+0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant can be calculated for each fiber type from the relation:

$$k = \{d_0(1-(M/M_0)^{0.5})/2t$$

where: k is the dissolution rate constant in SEF, $d_0$ the initial fiber diameter, the initial density of the glass comprising the fiber, $M_0$ the initial mass of the fibers, M the final mass of the fibers ($M/M_0$=the mass fraction remaining), and t the time over which the data was taken. Details of the derivation of this relation is given in Leinweber (1982) and Potter and Mattson (1991). Values for k may be reported in $ng/cm^2/hr$ and preferably exceed a value of 150. Replicate runs on several fibers in a given sample set show that k values are consistent to within 3 percent for a given composition.

Data obtained from the above outlined evaluation can be effectively correlated within the sample set chosen. The dissolution data used to derive k values for the glass fibers used in the products of the present invention were obtained only from experimental samples of uniform 3.0 micron diameter and under identical conditions on initial sample surface area per volume of fluid per unit time, and sample permeability. Data was obtained from runs of up to 30 days to obtain an accurate representation of the long term dissolution of the fibers. From these evaluations, the preferred biodissolution rate constants k (in $ng/cm^2/hr$) for glass fibers used in the lightweight glass fiber insulations of the present invention are greater than 150 $ng/cm^2/hr$, preferably equal to or greater than 200 $ng/cm^2/hr$, more preferably equal to or greater than 300 $ng/cm^2/hr$, and most preferably equal to or greater than 400 $ng/cm^2/hr$.

To the determine moisture resistance of the glass fibers, a stress corrosion test is used in which fibers are stressed by bending the fibers in a controlled humidity and temperature test chamber. Fibers which exhibit moisture resistance under these conditions take longer to break.

With respect to the preferred glass compositions used to form the glass fibers used in the insulation product of the present invention, by the term "consisting essentially of" is meant that additional ingredients may be added to the composition provided the additional ingredients do not substantially alter the nature of the composition. Substances which cause the biodissolution rate of the fibers made from the composition to drop below 150 $ng/cm^2/hr$ are substances which do substantially alter the composition. Preferably, the glass compositions are free of iron oxides, lead oxides, fluorine, phosphates ($P_2O_5$), zirconia, and other expensive oxides, except as unavoidable impurities.

Figure 6:
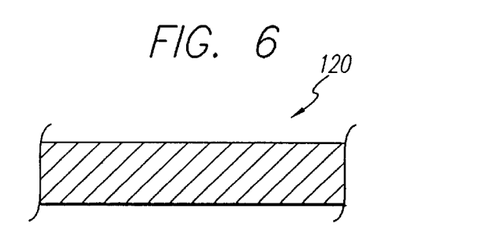
FIG. 6 is an enlarged schematic vertical cross section through a first embodiment of a fibrous mat of the present invention.
Figure 7:
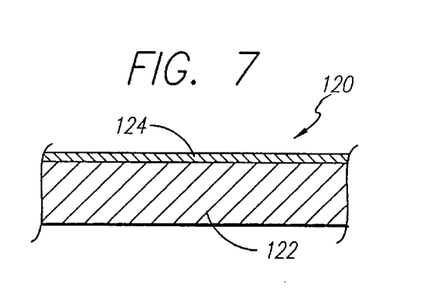
FIG. 7 is an enlarged schematic vertical cross section through a second embodiment of a fibrous mat of the present invention.
Figure 8:
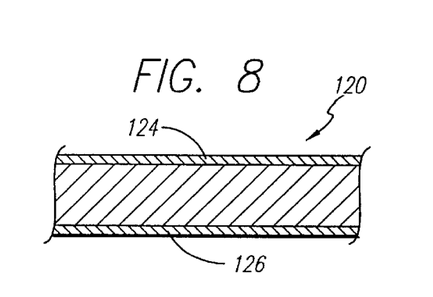
FIG. 8 is an enlarged schematic vertical cross section through a third embodiment of a fibrous mat of the present invention.

FIGS. 6, 7 and 8 show three embodiments of resilient fibrous mats 120 of the present invention which can be used as resilient battery separator media or for other applications. The embodiment of FIG. 6 shows the resilient fibrous mat 120 without skins or surface layers to provide the resilient fibrous mat with added integrity and tensile strength. The embodiment of FIG. 7 includes a resilient layer 122 and one surface layer or skin 124 to provide the resilient fibrous mat with added integrity and tensile strength. The embodiment of FIG. 8 includes a resilient layer 122 and two surface layers or skins 124 and 126 which provide the resilient fibrous mat 120 with additional integrity and tensile strength.

In the embodiment of FIG. 6, the resilient fibrous mat 120 is a resilient, air laid, fibrous mat 120 (preferably binderless) of randomly oriented, entangled fibers. The resilient fibrous mat 120 is uniform or essentially uniform in density throughout its thickness and the fiber entanglement within the resilient fibrous mat is uniform or essentially uniform throughout its thickness and provides the fibrous mat with the integrity and tensile strength required for its application such as but not limited to a battery separator media. While the fiber entanglement present in the air laid, fibrous mat 120 is sufficient for many applications, for other applications the tensile strength and integrity of the mat must be increased.

The tensile strength of the air laid, fibrous mat 120 of FIG. 6 may be increased while maintaining a substantially constant density across its thickness: by flooding the mat with a liquid, e.g. water and drawing a vacuum through the mat to felt the mat; by applying an acid solution to the mat to hydrolyze the surfaces of the glass fibers and bond the fibers together at their points of intersection, e.g. using an acid solution having a ph of about 3 rather than water to flood the mat when felting the mat; and/or by needling the fibrous mats in a conventional needling process to increase the entanglement of the fibers throughout the thicknesses of the mats.

The tensile strength and integrity of the air laid, fibrous mat 120 (preferably binderless mat) may also be increased by forming an integral surface layer or skin 124 or integral surface layers or skins 124 and 126 on the air laid fibrous mat 120 having greater fiber entanglement and density than the original air laid fibrous mat 120. The more compact, denser surface layers 124 and 126 of the embodiments of FIGS. 7 and 8 increase the tensile strength of the resilient fibrous mat 120 and also increase the tear resistance of one or both surfaces of the resilient fibrous mat 120 while the less entangled fibers of the less compact, less dense, resilient layer 122 provide the resilient fibrous mat with the required resilience. The formation of these skin(s) or surface layer(s) on the air laid fibrous mat 120 by further entangling the fibers at and adjacent the surface or surfaces of the mat through hydro-entanglement or other means to increase the tensile strength of the mat may be performed in conjunction with the needling of the mat to further entangle the fibers throughout its thickness and/or the hydrolyzation of the fiber surfaces within the mat with an acid solution to bond the fibers together at their points of intersection to increase the tensile strength of the air laid fibrous mat 120.

Where the resilient fibrous mat 120 is provided with two surface layers 124 and 126, the degree of fiber entanglement and the density of these two surface layers is normally equal or substantially equal. However, if desired, one surface layer can have greater fiber entanglement; be more compact; and have a greater density than the other surface layer. A resilient fibrous mat with surface layers of different densities may be beneficial for certain applications. For example, it might be beneficial in certain applications to have battery separators wherein the surface layers contacting the electrode plates of one polarity have a greater density than the surface layers contacting the electrode plates of the opposite polarity.

Preferably, the resilient air laid, fibrous mats 120 of FIGS. 6–8 are binderless and made with glass fibers having an uni-modal fiber distribution. However, it is contemplated that for certain special applications, the resilient fibrous mat 120 can include a limited amount of other fibers or mixtures of fibers (i.e. up to about 10% by weight) to give the mat specific characteristics, including but not limited to: glass fibers having a fiber distribution with a different mean diameter; polyester, polypropylene and other polymeric fibers; and cellulose fibers.

The mean diameters of the uni-modal fiber distributions of the glass fibers used to form the resilient, air laid, fibrous mats 120 can differ for different applications. As stated above, preferably, the mean diameters of the uni-modal fiber distributions of the fibers used in the mats 120 of the present invention are less 2.8 microns; preferably less than 2.5 microns, and more preferably less than 2.0 microns. However, for making resilient fibrous mats particularly suited for applications such as battery separators, for sealed, starved electrolyte, lead/acid batteries, it is preferred to use glass fibers have an uni-modal fiber diameter distribution with a mean fiber diameter of about 1.4 microns. In the preferred embodiments set forth in this paragraph, the resilient fibrous mats 120 range in weight from about 50 to about 450 grams per square meter; and more preferably from about 75 to about 150 grams per square meter. While the thicknesses and weights of the resilient fibrous mats 120 can vary, for uses such as battery separators, for starved electrolyte batteries, the resilient fibrous mats 120, in an uncompressed state, range in thickness from about 0.01 to about 0.5 inches and preferably, from about 0.05 to about 0.25 inches. While it is preferred to form the mats 120 of the present invention by air laying the fibers to form the mats or blankets of randomly oriented glass fibers, the fibers of the present invention can also be used in a conventional wet laid mat forming process, such as a Fourdrinier or Rotoformer process, to make wet laid mats.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making fine diameter glass fibers, comprising:

introducing molten glass into a rotary fiberization disc with an annular peripheral wall having a plurality of fiberizing orifices therein; the peripheral wall of the rotary fiberization disc having an exterior surface through which the fiberizing orifices pass; the fiberizing orifices having a diameter of about 0.023 inches or greater and having an effective open area for the passage of molten glass through the orifices between about 20 $cm^2$ and about 80 $cm^2$; and the molten glass having a viscosity between about 250 poise and about 2000 poise at a fiberizing temperature to be maintained within the rotary fiberization disc;

maintaining the molten glass within the disc at the fiberizing temperature;

rotating the rotary fiberization disc at a rate to cause the external surface of the peripheral wall of the rotary fiberization disc to have a velocity and to cause primary glass fibers to exit from the fiberizing orifices;

the molten glass passing through the fiberizing orifices having a velocity between about 3 cm/minute and about 15 cm/minute;

a ratio of the velocity of the external surface of the peripheral wall of the rotary fiberization disc to the velocity of the molten glass passing through the fiberizing orifices being between about 20,000 to 1 and about 40,000 to 1;

directing a curtain of hot combustion gases from an attenuating burner onto the primary glass fibers exiting the fiberizing orifices; the ratio of the BTU content of the fuel expended forming the hot combustion gases per pound of molten glass being fiberized to the BTU content of a pound of molten glass being fiberized being between about 10 to 1 and about 30 to 1; and creating an air curtain external of the fiberizing disc, by discharging air from an air ring, to inspirate air downward past the outer peripheral surface of the fiberizing disc and create with the hot combustion gases exiting the attenuating burner a curtain of hot, high velocity heated air and combustion gases to attenuate the primary fibers and form fine diameter fibers from the primary fibers; the air forming the air curtain having a velocity exiting the air ring; a ratio of the velocity of the air forming the air curtain to the velocity of the molten glass passing through the fiberizing orifices being between about 400,000 to 1 and about 1,200,000 to 1.

2. The method of making fine diameter glass fibers according to claim 1, wherein:
the fine diameter glass fibers formed have a mean diameter of about 2.5 microns or less.

3. The method of making fine diameter glass fibers according to claim 1, wherein:
the fine diameter glass fibers formed have a mean diameter of about 1.4 microns and an average length of about 1.0 millimeters or greater as measured by the Bauer-McNett testing method.

4. The method of making fine diameter glass fibers according to claim 1, wherein:
the molten glass has a composition for forming glass fibers having a biodissolution rate greater than 150 ng/cm$^2$/hr.

5. The method of making fine diameter glass fibers according to claim 1, wherein:
the molten glass has a composition for forming glass fibers having a biodissolution rate greater than 300 ng/cm$^2$/hr.

6. The method of making fine diameter glass fibers according to claim 1, wherein:
the molten glass has a composition for forming glass fibers having a biodissolution rate greater than 400 ng/cm$^2$/hr.

7. The method of making fine diameter glass fibers, according to claim 1, wherein:
the molten glass has a viscosity between about 850 poise and about 1650 poise.

8. The method of making fine diameter glass fibers according to claim 7, wherein:
the ratio of the velocity of the external surface of the peripheral wall of the rotary fiberization disc to the velocity of the molten glass passing through the fiberizing orifices is between about 25,000 to 1 and about 35,000 to 1;
the ratio of the BTU content of the fuel expended forming the hot combustion gases per pound of molten glass being fiberized to the BTU content of a pound of molten glass being fiberized is between about 14 to 1 and about 25 to 1; and
the ratio of the velocity of the air forming the air curtain to the velocity of the molten glass passing through the fiberizing orifices being between about 600,000 to 1 and about 1,000,000 to 1.

9. The method of making fine diameter glass fibers according to claim 8, wherein:
the fine diameter glass fibers formed have a mean diameter of about 2.5 microns or less.

10. The method of making fine diameter glass fibers according to claim 8, wherein:
the fine diameter glass fibers formed have a mean diameter of about 1.4 microns and an average length of about 1.0 millimeters or greater as measured by the Bauer-McNett testing method.

11. The method of making fine diameter glass fibers according to claim 8, wherein:
the molten glass has a composition for forming glass fibers having a biodissolution rate greater than 150 ng/cm$^2$/hr.

12. The method of making fine diameter glass fibers, according to claim 1, wherein:
the molten glass has a viscosity between about 1150 poise and about 1350 poise.

13. The method of making fine diameter glass fibers according to claim 12, wherein:
the ratio of the velocity of the external surface of the peripheral wall of the rotary fiberization disc to the velocity of the molten glass passing through the fiberizing orifices is between about 25,000 to 1 and about 35,000 to 1;
the ratio of the BTU content of the fuel expended forming the hot combustion gases per pound of molten glass being fiberized to the BTU content of a pound of molten glass being fiberized is between about 14 to 1 and about 25 to 1; and
the ratio of the velocity of the air forming the air curtain to the velocity of the molten glass passing through the fiberizing orifices being between about 600,000 to 1 and about 1,000,000 to 1.

14. The method of making fine diameter glass fibers according to claim 13, wherein:
the fine diameter glass fibers have a mean diameter of about 2.5 microns or less.

15. The method of making fine diameter glass fibers according to claim 13, wherein:
the fine diameter glass fibers have a mean diameter of about 1.4 microns and an average length of about 1.0 millimeters or greater as measured by the Bauer-McNett testing method.

16. The method of making fine diameter glass fibers according to claim 13, wherein:
the molten glass has a composition for forming glass fibers having a biodissolution rate greater than 150 ng/cm$^2$/hr.

17. The method of making fine diameter glass fibers, according to claim 13, wherein:
the ratio of the velocity of the external surface of the peripheral wall of the rotary fiberization disc to the velocity of the molten glass passing through the fiberizing orifices is between about 28,000 to 1 and about 32,000 to 1.

18. The method of making fine diameter glass fibers, according to claim 13, wherein:
the ratio of the BTU content of the fuel expended forming the hot combustion gases per pound of molten glass being fiberized to the BTU content of a pound of molten glass being fiberized is between about 21 to 1 and about 23 to 1.

19. The method of making fine diameter glass fibers, according to claim 13, wherein:
the ratio of the velocity of the air curtain to the velocity of the molten glass passing through the fiberizing orifices being between about 750,000 to 1 and about 850,000 to 1.

20. A method of making fine diameter glass fibers, comprising:
introducing molten glass into a rotary fiberization disc with an annular peripheral wall having a plurality of fiberizing orifices therein; the peripheral wall of the rotary fiberization disc having an exterior surface through which the fiberizing orifices pass; the fiberizing orifices having diameters of about 0.023 inches or greater and having an effective open area for the passage of molten glass through the orifices between about 40 cm$^2$ and about 70 cm$^2$; and the molten glass having a viscosity between about 850 poise and about 1650 poise at a fiberizing temperature to be maintained within the rotary fiberization disc;

maintaining the molten glass within the disc at the fiberizing temperature;

rotating the rotary fiberization disc at a rate to cause the external surface of the peripheral wall of the rotary fiberization disc to have a velocity and to cause primary glass fibers to exit from the fiberizing orifices;

the molten glass passing through the fiberizing orifices having a velocity between about 5 cm/minute and about 13 cm/minute;

a ratio of the velocity of the external surface of the peripheral wall of the rotary fiberization disc to the velocity of the molten glass passing through the fiberizing orifices being between about 25,000 to 1 and about 35,000 to 1;

directing a curtain of hot combustion gases from an attenuating burner onto the primary glass fibers exiting the fiberizing orifices; the ratio of the BTU content of the fuel expended forming the hot combustion gases per pound of molten glass being fiberized to the BTU content of a pound of molten glass being fiberized being between about 14 to 1 and about 25 to 1; and creating an air curtain, external of the fiberizing disc, by discharging air from an air ring, to inspirate air downward past the outer peripheral surface of the fiberizing disc and create with the hot combustion gases exiting the attenuating burner a curtain of hot, high velocity heated air and combustion gases to attenuate the primary fibers and form fine diameter fibers from the primary fibers; the air forming the air curtain having a velocity exiting the air ring; a ratio of the velocity of the air forming the air curtain to the velocity of the molten glass passing through the fiberizing orifices being between about 600,000 to 1 and about 1,000,000 to 1.

21. The method of making fine diameter glass fibers according to claim 20, wherein:

the fine diameter glass fibers formed have a mean diameter of about 2.5 microns or less.

22. The method of making fine diameter glass fibers according to claim 20, wherein:

the fine diameter glass fibers formed have a mean diameter of about 1.4 microns and an average length of about 1.0 millimeters or greater as measured by the Bauer-McNett testing method.

23. The method of making fine diameter glass fibers according to claim 20, wherein:

the molten glass has a composition for forming glass fibers having a biodissolution rate greater than 150 ng/cm$^2$/hr.

24. The method of making fine diameter glass fibers according to claim 20, wherein:

the molten glass has a composition for forming glass fibers having a biodissolution rate greater than 300 ng/cm$^2$/hr.

25. The method of making fine diameter glass fibers according to claim 20, wherein:

the molten glass has a composition for forming glass fibers having a biodissolution rate greater than 400 ng/cm$^2$/hr.

26. The method of making fine diameter glass fibers, according to claim 20, wherein:

the molten glass has a viscosity between about 1150 poise and about 1350 poise;

the ratio of the velocity of the external surface of the peripheral wall of the rotary fiberization disc to the velocity of the molten glass passing through the fiberizing orifices is between about 28,000 to 1 and about 32,000 to 1;

the ratio of the BTU content of the fuel expended forming the hot combustion gases per pound of molten glass being fiberized to the BTU content of a pound of molten glass being fiberized is between about 21 to 1 and about 23 to 1; and the ratio of the velocity of the air forming the air curtain to the velocity of the molten glass passing through the fiberizing orifices being between about 750,000 to 1 and about 850,000 to 1.

27. The method of making fine diameter glass fibers according to claim 26, wherein:

the fine diameter glass fibers formed have a mean diameter of about 2.5 microns or less.

28. The method of making fine diameter glass fibers according to claim 26, wherein:

the fine diameter glass fibers formed have a mean diameter of about 1.4 microns and an average length of about 1.0 millimeters or greater as measured by the Bauer-McNett testing method.

29. The method of making fine diameter glass fibers according to claim 26, wherein:

the molten glass has a composition for forming glass fibers having a biodissolution rate greater than 150 ng/cm$^2$/hr.

30. The method of making fine diameter glass fibers according to claim 29, wherein:

the molten glass consists essentially of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 |

31. A method of making a glass fiber mat of fine diameter glass fibers, comprising:

introducing molten glass into a rotary fiberization disc with an annular peripheral wall having a plurality of fiberizing orifices therein; the peripheral wall of the rotary fiberization disc having an exterior surface through which the fiberizing orifices pass; the fiberizing orifices having diameters of about 0.023 inches or greater and having an effective open area for the passage of molten glass through the orifices being between about 20 cm$^2$ and about 80 cm$^2$; and the molten glass having a viscosity between about 250 poise and about 2000 poise at a fiberizing temperature to be maintained within the rotary fiberization disc;

maintaining the molten glass within the disc at the fiberizing temperature;

rotating the rotary fiberization disc at a rate to cause the external surface of the peripheral wall of the rotary fiberization disc to have a velocity and to cause primary glass fibers to exit from the fiberizing orifices;

the molten glass passing through the fiberizing orifices having a velocity between about 3 cm/minute and about 15 cm/minute;

a ratio of the velocity of the external surface of the peripheral wall of the rotary fiberization disc to the velocity of the molten glass passing through the fiberizing orifices being between about 20,000 to 1 and about 40,000 to 1;

directing a curtain of hot combustion gases onto the primary glass fibers exiting the fiberizing orifices; the ratio of the BTU content of the fuel expended forming the hot combustion gases per pound of molten glass being fiberized to the BTU content of a pound of molten glass being fiberized being between about 10 to 1 and about 30 to 1;

creating an air curtain external of the fiberizing disc, by discharging air from an air ring, to inspirate air downward past the outer peripheral surface of the fiberizing disc and create with the hot combustion gases exiting the attenuating burner a curtain of hot, high velocity heated air and combustion gases to attenuate the primary fibers and form fine diameter glass fibers from the primary glass fibers; the air forming the air curtain having a velocity exiting the air ring; a ratio of the velocity of the air forming the air curtain to the velocity of the molten glass passing through the fiberizing orifices being between about 400,000 to 1 and about 1,200,000 to 1; and forming a mat of randomly oriented entangled glass fibers from the fine diameter glass fibers.

32. The method of making a glass fiber mat of fine diameter glass fibers according to claim 31, wherein:

the fine diameter glass fibers formed have a mean diameter of about 2.5 microns or less.

33. The method of making a glass fiber mat of fine diameter glass fibers according to claim 31, wherein:

the fine diameter glass fibers formed have a mean diameter of about 1.4 microns and an average length of about 1.0 millimeters or greater as measured by the Bauer-McNett testing method.

34. The method of making a glass fiber mat of fine diameter glass fibers according to claim 31, wherein:

the molten glass has a composition for forming glass fibers having a biodissolution rate greater than 150 ng/cm$^2$/hr.

35. The method of making a glass fiber mat of fine diameter glass fibers according to claim 31, wherein:

the molten glass has a composition for forming glass fibers having a biodissolution rate greater than 300 ng/cm$^2$/hr.

36. The method of making a glass fiber mat of fine diameter glass fibers according to claim 31, wherein:

the molten glass has a composition for forming glass fibers having a biodissolution rate greater than 400 ng/cm$^2$/hr.

37. The method of making a glass fiber mat of fine diameter glass fibers according to claim 31, wherein:

the glass fiber mat is made by an air-laid process.

38. The method of making a glass fiber mat of fine diameter glass fibers according to claim 31, wherein:

the glass fiber mat is made by a wet-laid process.

39. The method of making a glass fiber mat of fine diameter glass fibers, according to claim 31, wherein:

the molten glass has a viscosity between about 850 poise and about 1650 poise;

the ratio of the velocity of the external surface of the peripheral wall of the rotary fiberization disc to the velocity of the molten glass passing through the fiberizing orifices is between about 25,000 to 1 and about 35,000 to 1;

the ratio of the BTU content of the fuel expended forming the hot combustion gases per pound of molten glass being fiberized to the BTU content of a pound of molten glass being fiberized is between about 14 to 1 and about 25 to 1; and the ratio of the velocity of the air forming the air curtain to the velocity of the molten glass passing through the fiberizing orifices being between about 600,000 to 1 and about 1,000,000 to 1.

40. The method of making a glass fiber mat of fine diameter glass fibers according to claim 39, wherein:

the fine diameter glass fibers formed have a mean diameter of about 2.5 microns or less.

41. The method of making a glass fiber mat of fine diameter glass fibers according to claim 39, wherein:

the fine diameter glass fibers formed have a mean diameter of about 1.4 microns and an average length of about 1.0 millimeters as measured by the Bauer-McNett testing method.

42. The method of making a glass fiber mat of fine diameter glass fibers according to claim 39, wherein:

the molten glass has a composition for forming glass fibers having a biodissolution rate greater than 150 ng/cm$^2$/hr.

43. The method of making a glass fiber mat of fine diameter glass fibers according to claim 39, wherein:

the glass fiber mat is made by an air-laid process.

44. The method of making a glass fiber mat of fine diameter glass fibers according to claim 39, wherein:

the glass fiber mat is made by a wet-laid process.

45. The method of making a glass fiber mat of fine diameter glass fibers, according to claim 31, wherein:

the molten glass has a viscosity between about 1150 poise and about 1350 poise;

the ratio of the velocity of the external surface of the peripheral wall of the rotary fiberization disc to the velocity of the molten glass passing through the fiberizing orifices is between about 28,000 to 1 and about 32,000 to 1;

the ratio of the BTU content of the fuel expended forming the hot combustion gases per pound of molten glass being fiberized to the BTU content of a pound of molten glass being fiberized is between about 21 to 1 and about 23 to 1; and the ratio of the velocity of the air forming the air curtain to the velocity of the molten glass passing through the fiberizing orifices being between about 750,000 to 1 and about 850,000 to 1.

46. The method of making a glass fiber mat of fine diameter glass fibers according to claim 45, wherein:

the fine diameter glass fibers formed have a mean diameter of about 2.5 microns or less.

47. The method of making a glass fiber mat of fine diameter glass fibers according to claim 45, wherein:

the fine diameter glass fibers formed have a mean diameter of about 1.4 microns and an average length of about 1.0 millimeters as measured by the Bauer-McNett testing method.

48. The method of making a glass fiber mat of fine diameter glass fibers according to claim 45, wherein:

the glass fiber mat is made by an air-laid process.

49. The method of making a glass fiber mat of fine diameter glass fibers according to claim 45, wherein:

the glass fiber mat is made by a wet-laid process.

50. The method of making a glass fiber mat of fine diameter glass fibers according to claim 45, wherein:

the molten glass has a composition for forming glass fibers having a biodissolution rate greater than 150 $ng/cm^2/hr$.

51. The method of making a glass fiber mat of fine diameter glass fibers according to claim 50, wherein:

the molten glass consists essentially of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 |

\* \* \* \* \*